(12) United States Patent
Logan et al.

(10) Patent No.: US 8,135,921 B2
(45) Date of Patent: Mar. 13, 2012

(54) AUTOMATED PAGING DEVICE MANAGEMENT IN A SHARED MEMORY PARTITION DATA PROCESSING SYSTEM

(75) Inventors: Bryan M. Logan, Rochester, MN (US); James A. Pafumi, Leander, TX (US); Steven E. Royer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/403,426

(22) Filed: Mar. 13, 2009

(65) Prior Publication Data

US 2009/0307438 A1  Dec. 10, 2009

Related U.S. Application Data

(60) Provisional application No. 61/059,492, filed on Jun. 6, 2008.

(51) Int. Cl.
*G06F 12/00* (2006.01)

(52) U.S. Cl. ............. 711/153; 711/6; 711/170; 711/173

(58) Field of Classification Search .................. None
See application file for complete search history.

(56) References Cited

U.S. PATENT DOCUMENTS

| | | | |
|---|---|---|---|
| 5,909,540 A | 6/1999 | Carter et al. | |
| RE36,462 E | 12/1999 | Chang et al. | |
| 6,769,017 B1 | 7/2004 | Bhat et al. | |
| 6,976,137 B2 | 12/2005 | Ouren et al. | |
| 7,305,592 B2 | 12/2007 | Neiger et al. | |
| 7,337,296 B2 | 2/2008 | Noel et al. | |
| 7,506,095 B2 | 3/2009 | Otte et al. | |
| 7,680,754 B2 | 3/2010 | Hillier | |
| 7,698,531 B2 | 4/2010 | Flemming et al. | |
| 7,702,843 B1 | 4/2010 | Chen et al. | |
| 7,849,347 B2 | 12/2010 | Armstrong et al. | |
| 2002/0010844 A1 | 1/2002 | Noel et al. | |
| 2002/0087611 A1 | 7/2002 | Tanaka et al. | |
| 2002/0138704 A1 | 9/2002 | Hiser et al. | |
| 2003/0084372 A1 | 5/2003 | Mock et al. | |
| 2004/0139287 A1 | 7/2004 | Foster et al. | |
| 2004/0193861 A1 | 9/2004 | Michaelis | |
| 2004/0199599 A1 | 10/2004 | Nichols et al. | |
| 2005/0071446 A1 | 3/2005 | Graham et al. | |
| 2005/0132249 A1 | 6/2005 | Burton et al. | |

(Continued)

OTHER PUBLICATIONS

Office Action for U.S. Appl. No. 12/478,990 (U.S. Patent Publication No. 2009-0307538 A1), dated Jan. 19, 2011.

(Continued)

*Primary Examiner* — Shawn X Gu

(74) *Attorney, Agent, or Firm* — Heslin Rothenberg Farley & Mesiti, P.C.

(57) ABSTRACT

Automated paging device management is provided for a shared memory partition data processing system. The automated approach includes managing a paging storage pool defined within one or more storage devices for holding logical memory pages external to physical memory managed by a hypervisor of the processing system. The managing includes: responsive to creation of a logical partition within the processing system, automatically defining a logical volume in the paging storage pool for use as a paging device for the new logical partition, the automatically defining occurring absent use of a filesystem, with the resultant paging device being other than a file in a filesystem; and automatically specifying the logical volume as a paging space device for the new logical partition and binding the paging space device to the new logical partition, wherein the logical volume is sized to accommodate a defined maximum memory size of the new logical partition.

20 Claims, 9 Drawing Sheets

U.S. PATENT DOCUMENTS

| | | |
|---|---|---|
| 2005/0160151 A1 | 7/2005 | Rawson, III |
| 2005/0240932 A1 | 10/2005 | Billau et al. |
| 2005/0278719 A1 | 12/2005 | Togawa |
| 2006/0075207 A1 | 4/2006 | Togawa et al. |
| 2006/0101224 A1 | 5/2006 | Shah et al. |
| 2006/0123217 A1 | 6/2006 | Burdick et al. |
| 2006/0146057 A1 | 7/2006 | Blythe |
| 2006/0195673 A1 | 8/2006 | Arndt et al. |
| 2006/0236059 A1 | 10/2006 | Fleming et al. |
| 2007/0061441 A1 | 3/2007 | Landis et al. |
| 2007/0112999 A1 | 5/2007 | Oney et al. |
| 2007/0168635 A1 | 7/2007 | Allen et al. |
| 2007/0210650 A1 | 9/2007 | Togashi |
| 2007/0299990 A1 | 12/2007 | Ben-Yehuda et al. |
| 2008/0040565 A1 | 2/2008 | Rozas et al. |
| 2008/0071755 A1 | 3/2008 | Barsness et al. |
| 2008/0082696 A1 | 4/2008 | Bestler |
| 2008/0082975 A1 | 4/2008 | Oney et al. |
| 2008/0183996 A1 | 7/2008 | Field et al. |
| 2008/0256321 A1 | 10/2008 | Armstrong et al. |
| 2008/0256327 A1 | 10/2008 | Jacobs et al. |
| 2008/0256530 A1 | 10/2008 | Armstrong et al. |
| 2009/0100237 A1 | 4/2009 | Orikasa et al. |
| 2009/0144510 A1 | 6/2009 | Wibling et al. |
| 2009/0307436 A1 | 12/2009 | Larson et al. |
| 2009/0307439 A1 | 12/2009 | Jacobs et al. |
| 2009/0307440 A1 | 12/2009 | Jacobs et al. |
| 2009/0307441 A1 | 12/2009 | Hepkin et al. |
| 2009/0307445 A1 | 12/2009 | Jacobs et al. |
| 2009/0307447 A1 | 12/2009 | Jacobs et al. |
| 2009/0307538 A1 | 12/2009 | Hernandez et al. |
| 2009/0307688 A1 | 12/2009 | Pafumi et al. |
| 2009/0307690 A1 | 12/2009 | Logan et al. |
| 2009/0307713 A1 | 12/2009 | Anderson et al. |
| 2010/0079302 A1 | 4/2010 | Eide et al. |
| 2010/0083252 A1 | 4/2010 | Eide et al. |

OTHER PUBLICATIONS

Office Action for U.S. Appl. No. 12/403,408 (U.S. Patent Publication No. 2009-0307436 A1), dated Jul. 15, 2011.

Office Action for U.S. Appl. No. 12/403,485 (U.S. Patent Publication No. 2009/0307447 A1), dated Apr. 28, 2011.

Office Action for U.S. Appl. No. 12/403,447 (U.S. Patent Publication No. 2009/0307440 A1), dated May 11, 2011.

Office Action for U.S. Appl. No. 12/403,472 (U.S. Patent Publication No. 2009/0307441 A1), dated Sep. 22, 2011.

Office Action for U.S. Appl. No. 12/403,485 (U.S. Patent Publication No. 2009/0307447A1), dated Oct. 7, 2011.

Kloster et al., "Efficient Memory Sharing in the Xen Virtual Machine Monitor" (Jan. 2006) Department of Computer Science, Aalborg University.

Waldspurger, Carl A., "Memory Resource Management in VMware ESX Server" (Dec. 2002) ACM, OSDI'02.

Office Action for U.S. Appl. No. 12/403,485 (U.S. Application Publication No. 2009-0307447 A1) dated Oct. 7, 2011.

Notice of Allowance for U.S. Appl. No. 12/403,447 (U.S. Application Publication No. 2009-0307440 A1) dated Oct. 18, 2011.

Office Action for U.S. Appl. No. 12/403,440 (U.S. Application Publication No. 2009-0307439 A1) dated Oct. 27, 2011.

Office Action for U.S. Appl. No. 12/403,402 (U.S. Application Publication No. 2009-0707713 A1) dated Nov. 30, 2011.

IBM International Technical Support Organization, "HiperSockets Implementation Guide", pp. 1-132 (Mar. 2007).

Valdez, E. et al., "Retrofitting the IBM POWER Hypervisor to Support Mandatory Access Control", 23rd Annual Computer Security Applications Conference (pp. 221-230) (2007).

Notice of Allowance for U.S. Appl. No. 12/403,408 (U.S. Application Publication No. 2009-0307436 A1) dated Dec. 19, 2011.

AUTOMATED PAGING DEVICE MANAGEMENT IN A SHARED MEMORY PARTITION DATA PROCESSING SYSTEM

CROSS-REFERENCE TO RELATED APPLICATION

This application claims the benefit of U.S. provisional application Ser. No. 61/059,492, filed Jun. 6, 2008, entitled "Virtual Real Memory", the entirety of which is incorporated herein by reference.

TECHNICAL FIELD

The present invention relates generally to data processing systems, and more particularly, to automated paging device management in the hypervisor-managed paging environment of a shared memory partition data processing system.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output (I/O) services to one or more other LPARs of the data processing system. This offloading of higher-level function avoids complex code in the hypervisor, and thus, assists in maintaining the hypervisor small and secure within the data processing system.

Currently, the number of logical partitions (LPARs) that may be created on a partitionable server of the data processing system is bound by the amount of real memory available on that server. That is, if the server has 32 GBs of real memory, once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient. Also, memory is difficult to fully utilize in this way since there are frequently large amounts of infrequently accessed memory in idle partitions. However, that memory needs to be available to the operating system(s) to handle sudden spikes in workload requirements.

SUMMARY OF THE INVENTION

To address this need, the concept of a shared memory partition has been created. A shared memory partition's memory is backed by a pool of physical memory in the server that is shared by other shared memory partitions on that server. The amount of physical memory in the pool is typically smaller than the sum of the logical memory assigned to all of the shared memory partitions in the pool to allow the memory to be more fully utilized. Idle and/or less active logical memory in the shared partitions that does not fit in the physical memory pool is paged out by the hypervisor to a cheaper and more abundant form of storage (i.e., the paging devices) via an entity external to the hypervisor known as a paging service partition. In one implementation, the paging device(s) are defined in one or more physical storage disks. Disclosed herein are automated processes for managing the paging devices, (referred to herein as the paging space devices), for example, to automatically create, delete and/or resize a paging space device as the corresponding client logical partition is created, deleted or resized.

Provided herein therefore, in one aspect, is a computer-implemented method of managing paging space devices in a shared memory partition data processing system. The method includes: managing a paging storage pool comprising one or more physical storage devices for holding logical memory pages external to physical memory managed by a hypervisor of the shared memory partition data processing system. The managing includes: responsive to creation of a new logical partition within the shared memory partition data processing system, automatically defining a logical volume for the paging storage pool from block storage for use as a paging space device for the new logical partition, the automatically defining occurring absent use of a filesystem, with the paging space device being other than a file in a filesystem, and automatically specifying the logical volume as the paging space device for the new logical partition and binding the paging space device to the new logical partition, wherein the logical volume is sized to accommodate a defined maximum memory size of the new logical partition.

In another aspect, a shared memory data processing system is provided. The data processing system includes one or more physical storage devices comprising a paging storage pool for holding logical memory pages external to physical memory managed by a hypervisor of the shared memory partition data processing system, and a paging service partition coupled to the one or more physical storage devices for managing the paging storage pool. The paging service partition is a virtual input/output server (VIOS) partition of the shared memory partition data processing system, and includes a configuration manager for, in part, managing the paging storage pool. The configuration manager responds to creation of a new logical partition within the shared memory partition data processing system by automatically defining a logical volume in the paging storage pool from block storage for use as a paging space device for the new logical partition, the automatically defining occurring absent use of a filesystem, with the paging space device being other than a file in a filesystem, and wherein the configuration manager further automatically specifies the logical volume as the paging space device for the new logical partition and binds the paging space device to the new logical partition, wherein the logical volume is sized to accommodate a defined maximum memory size of the new logical partition.

In a further aspect, an article of manufacture is provided which includes at least one computer-readable medium having computer-readable program code logic to manage paging space devices in a shared memory data processing system. The computer-readable program code logic when executing on a processor performing managing of a paging storage pool within one or more physical storage devices for holding logical memory pages external to physical memory managed by a hypervisor of the shared memory partition data processing system. The managing includes: responsive to creation of a new logical partition within the shared memory partition data processing system, automatically defining a logical volume in the paging storage pool for use as a paging space device for the new logical partition. The automatically defining occurring absent use of a filesystem, wherein the paging device is other than a file in a filesystem; and automatically specifying the logical volume as the paging space device for the new logical partition and binding the paging space device to the new logical partition, wherein the logical volume is sized to accommodate a defined maximum memory size of the new logical partition.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
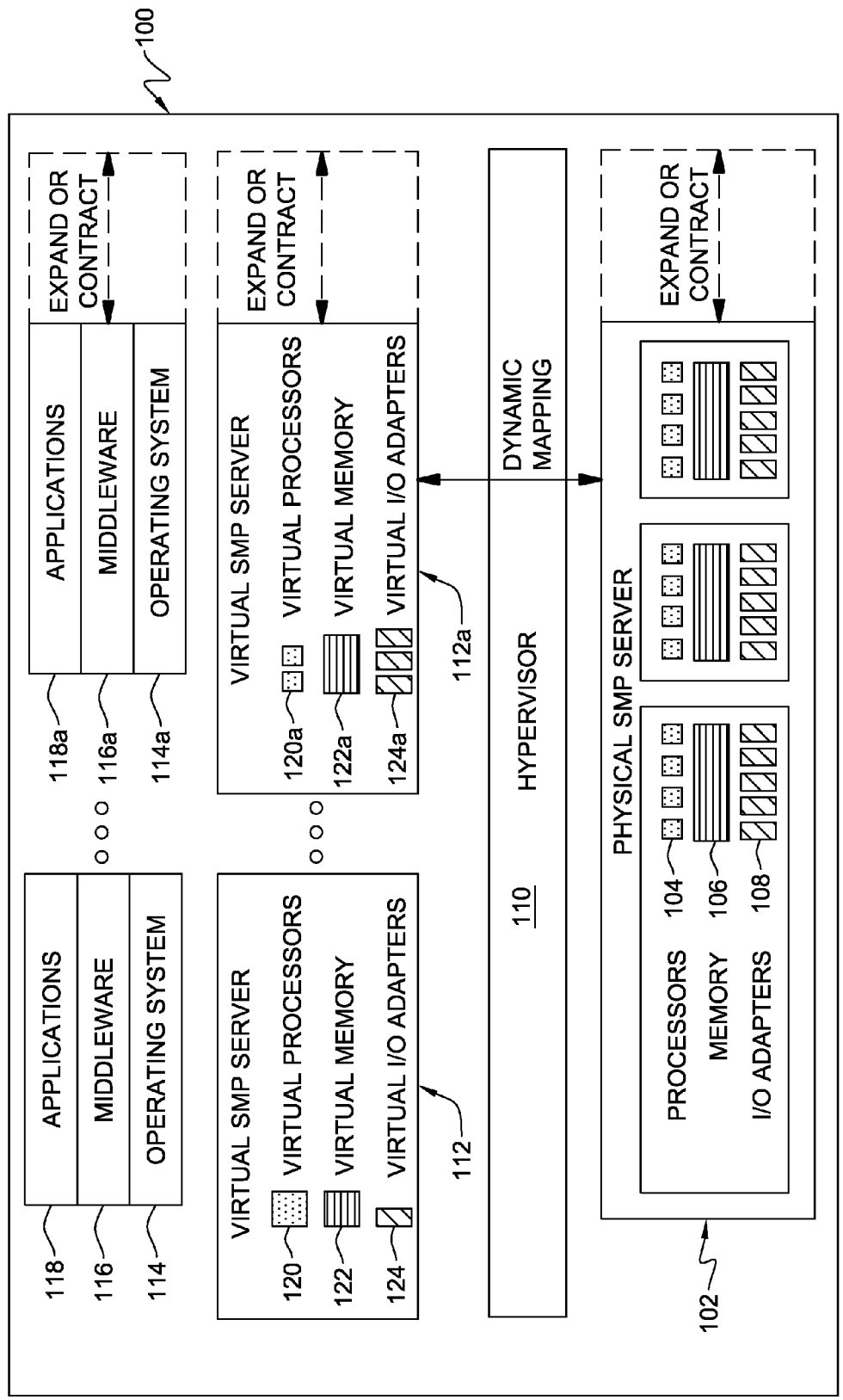
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
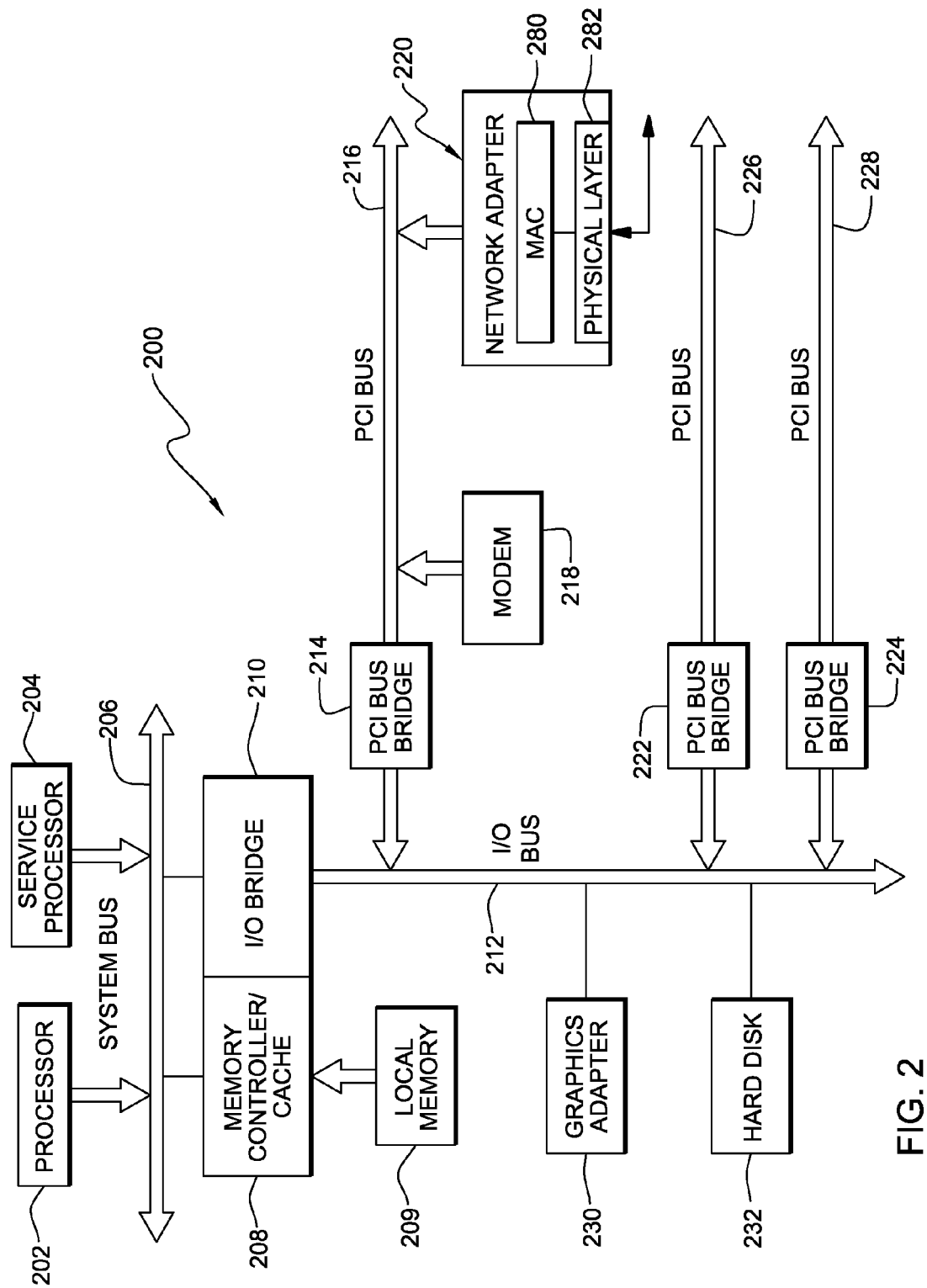
FIG. 2 is a more detailed illustration of a data processing system which could be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described hereinbelow can be built upon technologies found in IBM's p/i Series product line firmware and systemware, as described in the "Power Architecture Platform Reference" (PAPR) material at Power.org (http://www.power.org/members/developers/specs/PAPR_Version_2.7_09Oct07.pdf), which is hereby incorporated herein by reference. In addition, a virtual input/output server (VIOS) is commercially available as part of a PowerVM computing system offered by International Business Machines Corporation. The VIOS allows sharing of physical resources between logical partitions, including virtual SCSI and virtual networking. This allows more efficient utilization of physical resources through sharing between logical partitions and facilitates server consolidation. (IBM, pSeries, iSeries and PowerVM are registered trademarks of International Business Machines Corporation, Armonk, N.Y., U.S.A. Other names used herein may be registered trademarks, trademarks, or product names of International Business Machines Corporation or other companies.)

Figure 3:
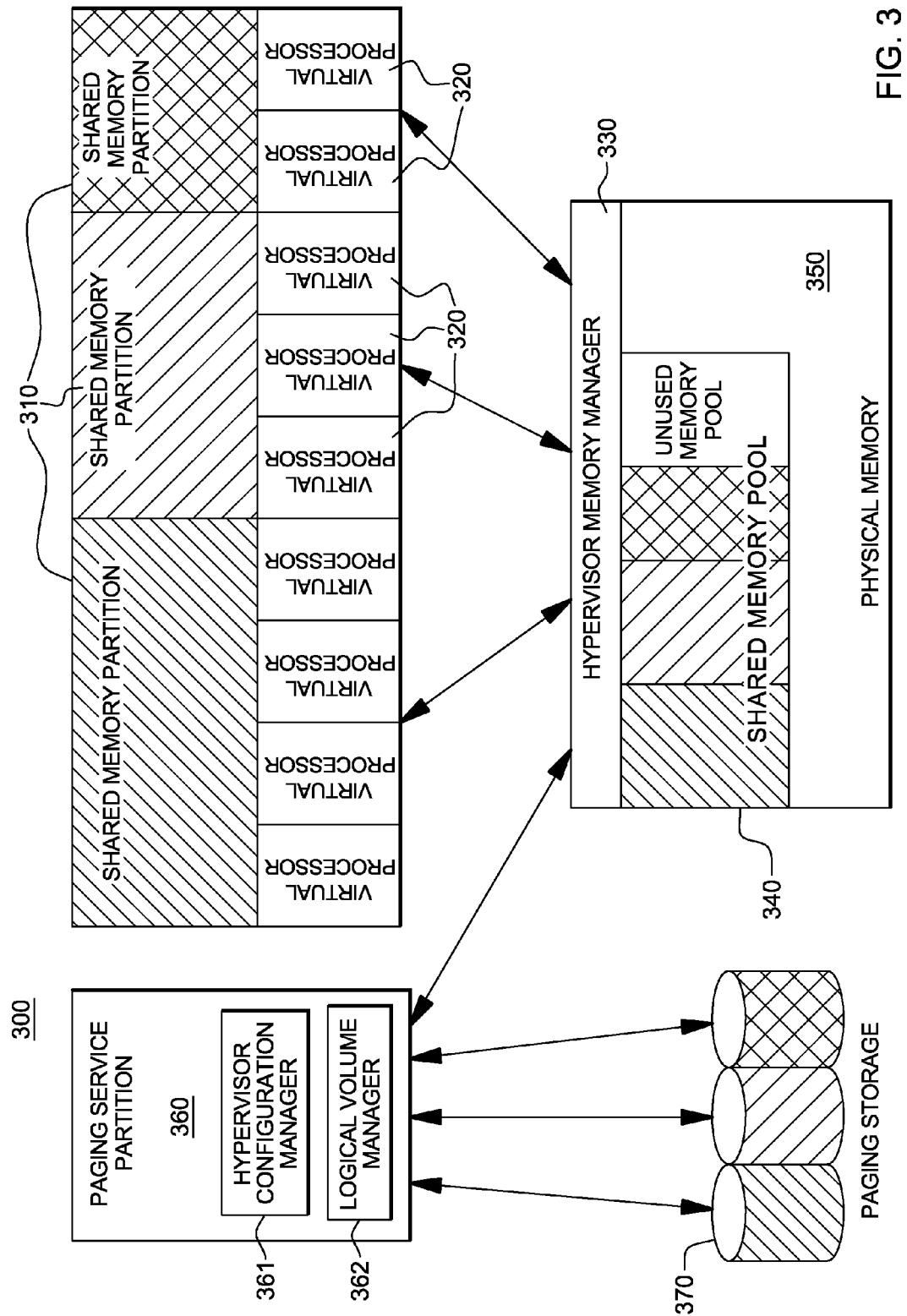
FIG. 3 illustrates one embodiment of a data processing system comprising multiple shared memory partitions employing a shared (or common) memory pool within physical memory of the data processing system, in accordance with an aspect of the present invention.

As noted, partition computing platforms have presented challenges to fully utilize available resources in the partitioned server. One approach to achieving this goal has been the creation of a shared memory partition data processing system, generally denoted 300, such as depicted in FIG. 3. As illustrated, the shared memory partition data processing system 300 includes one or more shared memory partitions 310, each of which comprises one or more virtual processors 320, which interface through a hypervisor, and more particularly, a hypervisory memory manager 330, to a shared memory pool 340 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 340 is paged out by the hypervisor to a more abundant, less expensive storage (such as disk storage), via a paging service partition 360. Paging service partition 360 is an enhanced virtual input/output service (VIOS) partition configured to facilitate paging-out and paging-in of memory pages from or to, respectively, the shared memory pool.

As shown, paging service partition 360 includes a hypervisor configuration manager (or configuration manager) 361 and a logical volume manager 362. One embodiment of a hypervisor configuration manager 361 and a logical volume manager 362 is provided as part of the VIOS partition provided with the Power5 and Power6 computing platforms offered by International Business Machines Corporation. Further details of a configuration manager for a VIOS partition can be found in http://www.redbooks.ibm.com/abstracts/redp4061.html?Open, and http://www.redbooks.ibm.com/abstracts/sg247940.html?Open, while further details of a logical volume manager can be found in http://www.redbooks.ibm.com/abstracts/sg245432.html?Open. Generally stated, the hypervisor configuration manager within the VIOS partition, or more particular, to the present invention, within the paging service partition, coordinates between the hypervisor and the logical volume manager to perform various tasks, including the creating, deleting and changing of logical volume sizes, as described further herein. The logical volume manager handles lower-level implementation details, including where to physically place a logical volume on the one or more physical storage disks and adjusting of the size of a logical volume. In implementation, the hypervisor configuration manager employs the logical volume manager in implementing the concepts described herein. Provided herein are various enhancements to the configuration manager of the paging service partition which allows the configuration manager to automatically manage paging space devices for the logical partitions as the logical partitions are created, deleted and reconfigured.

Also, although referred to as a shared memory pool, in reality, there is no sharing of memory per se, but rather a sharing of the availability of a defined amount of physical memory in the pool. This shared memory pool is alternatively characterized as active memory, or virtual real memory. The amount (or volume) of memory within shared memory pool may be dynamically allocated or adjusted between the shared memory partitions into sub-volumes or sets of physical pages to accommodate workloads. These dynamically allocated or adjusted sub-volumes or sets of physical pages from the shared memory pool are associated with the multiple logical partitions, and may comprise contiguous or disparate physical memory locations within the shared memory pool. A physical memory page of the shared memory pool becomes part of a sub-volume of a particular logical partition when a logical memory page thereof is associated with or mapped to that physical page. Although referred to as a shared memory pool, there is no concurrent sharing of access to a physical page per se, but rather a sharing of the defined amount of physical memory in the pool. Each shared memory partition with at least one logical memory page mapped to a physical memory page in the pool has an associated sub-volume or set of physical memory of the shared memory pool.

The hypervisor utilizes the shared memory pool in combination with the virtual input/output (VIO) adapter connections to handle paging operations for the shared memory partitions. The hypervisor memory manager manages which physical pages map to which logical memory pages of a given shared memory partition. The management of these pages is transparent to the shared memory partitions and handled fully by the hypervisor. When a logical page is required by a shared memory partition and it does not have a physical mapping in the shared memory pool, the hypervisor treats this request to access as an internal fault (i.e., hypervisor page fault). In response to a hypervisor page fault for a logical memory page that is not resident in the shared memory pool, an input/output (I/O) paging request is allocated by the hypervisor from a pool of free I/O paging requests and sent via the paging service partition to the external page storage of the data processing system to request the needed memory page. The partition's virtual processor encountering the hypervisor page fault is concurrently placed into a wait state, which blocks further execution of that processor until the I/O paging request is satisfied, or if the hypervisor page fault occurred while external interrupts were enabled for the virtual processor, until an external or timer interrupt occurs. The I/O paging request is submitted to the VIO adapter of the paging service partition, which communicates with the paging service partition in order to retrieve and return the correct logical memory page to fulfill the hypervisor page fault. The same process is also used by the hypervisor memory manager to free up a physical page within the shared memory pool currently mapped to a logical memory page of a shared memory partition, for example, when needed by either that shared memory partition or another shared memory partition.

Figure 4:
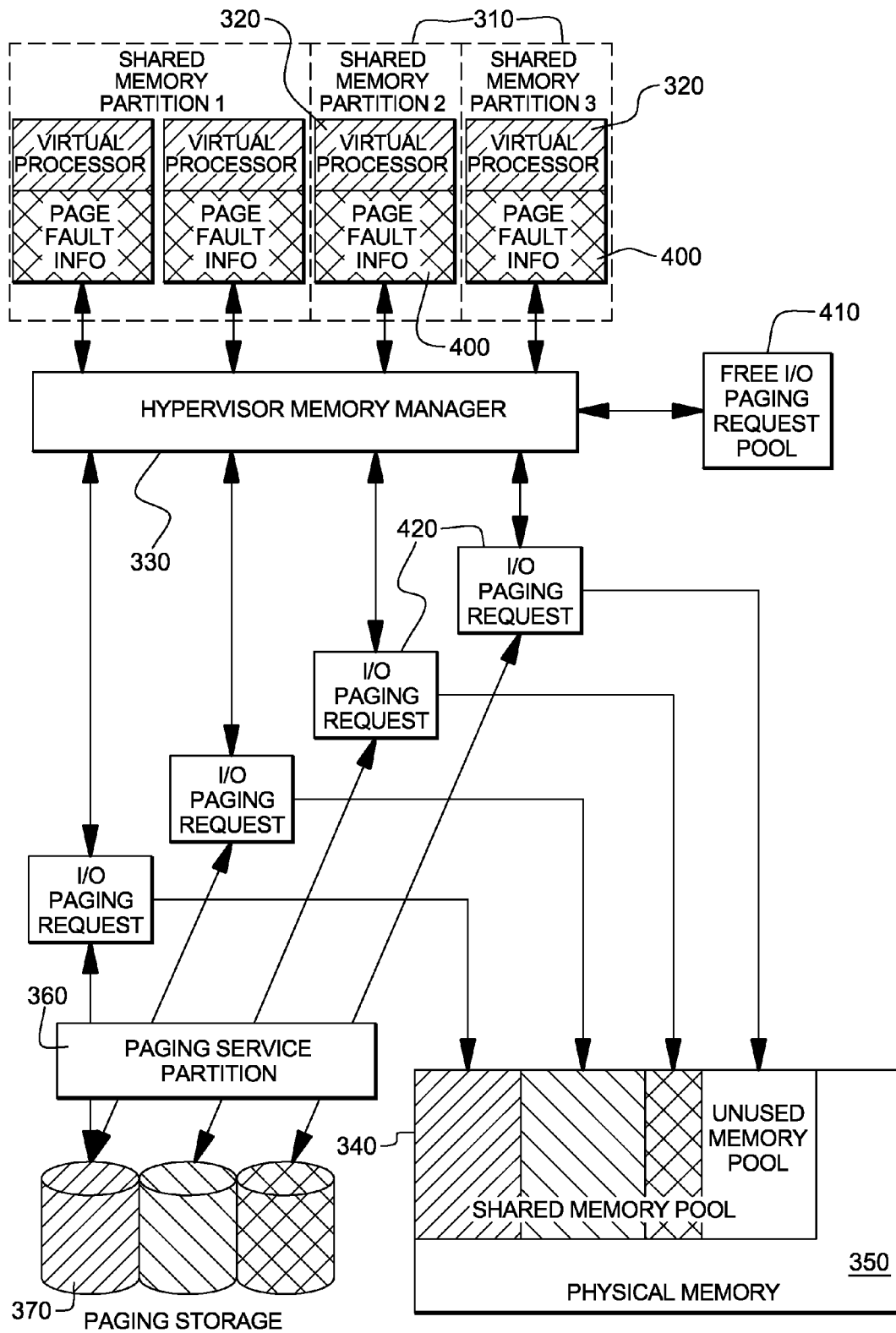
FIG. 4 illustrates one embodiment of an approach for handling hypervisor page faults within a shared memory partition data processing system, such as depicted in FIG. 3, in accordance with an aspect of the present invention.

FIG. 4 illustrates one operational embodiment of handling hypervisor page faults within a shared memory partition data processing system such as described above in connection with FIG. 3. In this embodiment, three shared memory partitions 310, i.e., shared memory partition 1, shared memory partition 2 & shared memory partition 3, are illustrated, each comprising one or more virtual processors 320, and each encountering a hypervisor page fault 400. Each hypervisor page fault is responsive to a request by a virtual processor 320 for memory that is not resident in the shared memory pool 340 of physical memory 350. Responsive to this, the hypervisor memory manager 330 takes an I/O paging request 420 from a free I/O paging request pool 410 and sends, via the paging service partition 360, the I/O paging request to the external storage entity 370 to request the needed page. Concurrent with requesting the needed page, the partition's virtual processor encountering the hypervisor page fault is placed into a wait state.

As briefly noted above, presented herein is an automated approach to managing creation, deletion and resizing of paging space devices for client logical partitions in a shared memory partition data processing system as client logical partitions are created, deleted or resized. Conventionally, hypervisor-level paging employs files in a filesystem as paging space devices for the data processing system. As one example, a VMware ESX server employs a filesystem to organize paging devices as files. When using files in a filesystem, the paging devices may be managed by the filesystem to create, delete and resize the corresponding file. However, paging to a file in a filesystem adds overhead, potentially doubling the CPU resources and physical memory required. As an alternative approach, a higher performance paging device is provided herein by employing raw block storages, that is, storage of the physical disks, as logical volumes, absent use of a filesystem. By eliminating filesystem overhead, better performance is achieved, but automatic management of files is no longer conventionally possible, since the user would need to manage creation of both the logical partition and the paging space device for use by the logical partition, while ensuring that the size of the paging space device is equal to or greater than the size of the memory requirements for the newly created logical partition. Presented hereinbelow is an automated, configuration manager-implemented approach to managing (in a storage pool lacking a filesystem) paging device creation, deletion and resizing as the corresponding client logical partition is created, deleted and resized.

Figure 5:
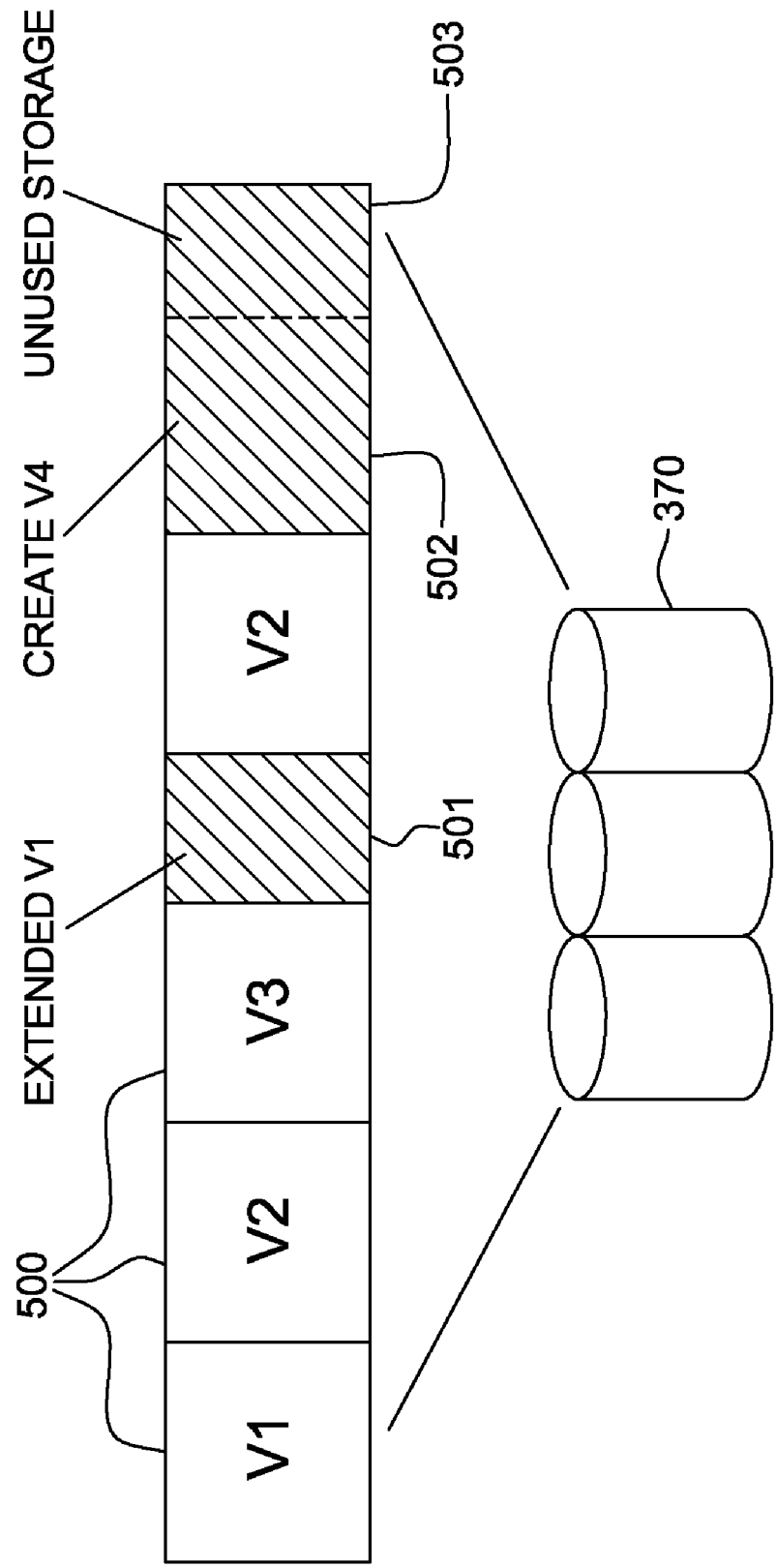
FIG. 5 illustrates one embodiment of a paging storage pool (within one or more or physical storage devices) which is logically configured as a plurality of logical volumes, each logical volume being specified as a paging space device for a respective logical partition of the shared memory partition data processing system, in accordance with an aspect of the present invention.

FIG. 5 depicts one embodiment of a physical storage pool designated a paging storage pool. This paging storage pool is within one or more physical storage devices 370. As illustrated, the paging storage pool is broken into multiple logical volumes 500, designated volumes V1, V2 & V3, by way of example. (As noted above, logical volumes for different uses, and the logical volume manager, are known concepts in existing UNIX-based computing systems.) The illustrated logical volumes reside on top of the underlying physical storage, with each logical volume being designated herein by appropriate metadata as a specific paging device (or paging space device) for a corresponding client logical partition of the shared memory partition data processing system. Each logical volume may comprise a contiguous set of physical memory space (e.g., volume V3), or a discontinuous set of physical memory space, as illustrated by logical volume V2 in FIG. 5. In the example illustrated, logical volume V1 is being extended 501, and logical volume V4 is being created 502. Space 503 remains unused storage space within the paging storage pool. The logical volume manager interfaces with the paging storage pool and handles reading and writing of memory pages to the defined logical volumes. If necessary to resize a logical volume, more space can be added from the paging storage pool to the logical volume, as explained further below. Also, the logical volumes can be broken into different pieces of memory such that the memory becomes fragmented within the physical storage pool.

Figure 6:
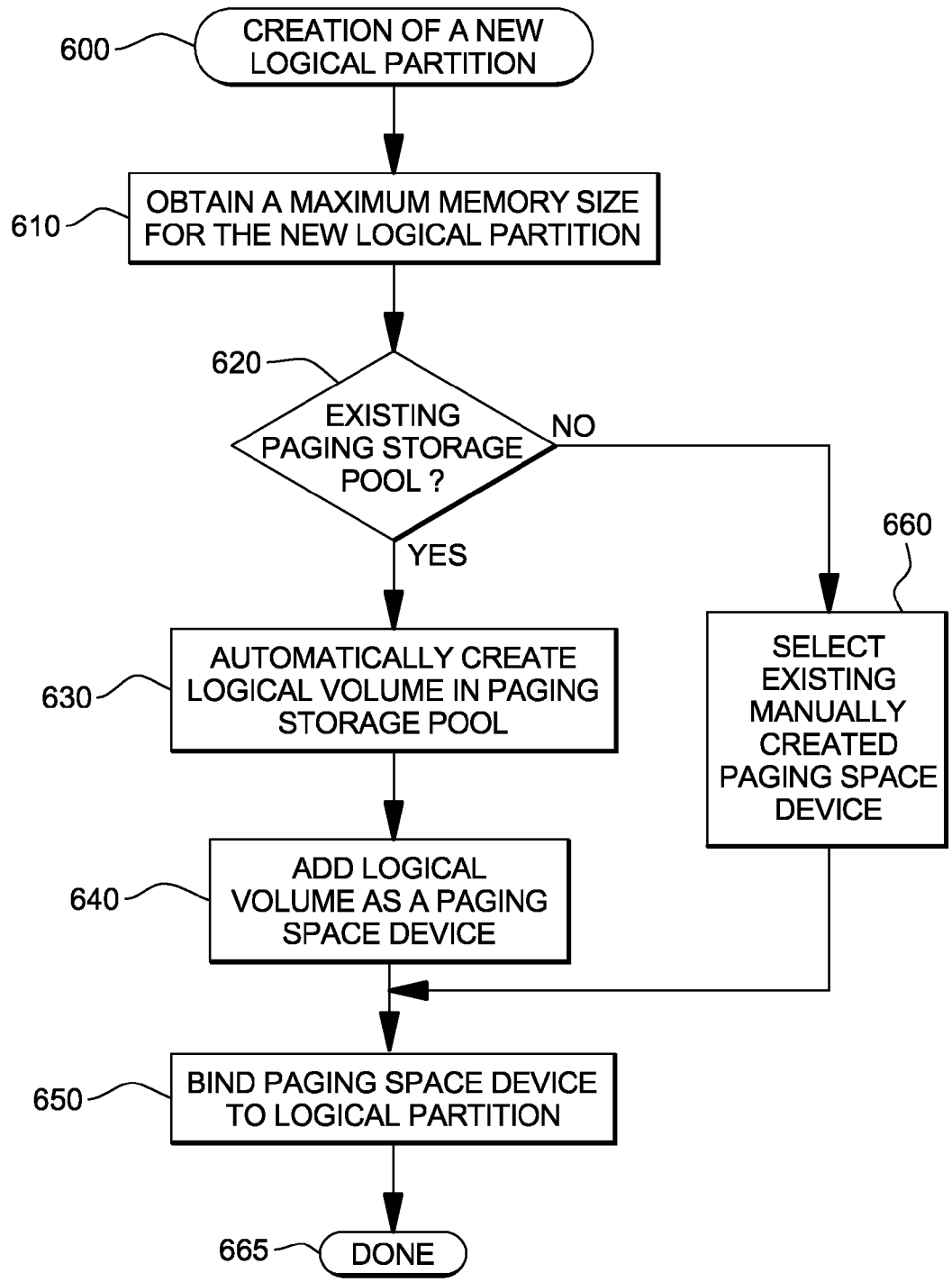
FIG. 6 is a flowchart of one embodiment of logic for managing creation of a paging space device for a new logical partition of a shared memory partition data processing system, in accordance with an aspect of the present invention.

FIG. 6 depicts one embodiment of configuration manager-implemented logic for automatically creating a new paging space device for a newly created logical partition. As noted, in one embodiment, this logic is implemented within a configuration manager of a VIOS partition, such as the hypervisor configuration manager within the paging service partition illustrated in FIG. 3. The paging storage pool (or volume group) is assumed to hold all of the paging space devices for the client logical partitions of the data processing system. Metadata is stored about the logical volumes to be automatically managed from the paging service partition. This allows the data processing system to be able to distinguish between, for example, normal, manual or user-created logical volumes and logical volumes designed as paging space devices automatically established and managed, as described herein. When a new client logical partition is created, a new logical volume is allocated from the paging storage pool to be a paging space device for that logical partition. Similarly, when the client partition is deleted, its paging space device is automatically deleted, and when the client partition is resized, its paging space device is automatically resized to match. This automated management facility allows a storage pool to be used that is not dedicated to containing only automatically established paging devices. For example, the storage pool could contain manually-created logical volumes that may or may not be used as paging devices, without disrupting the user's manual configuration or the non-paging devices within the storage pool. Also, by allowing storage to be managed by the hypervisor configuration manager, non-paging storage in the volume group can be protected by not requiring the user to have access to the storage pool configuration. Therefore, accidental deletion of real data can be eliminated.

As shown in FIG. 6, when a client logical partition is created 600, a new logical volume is to be allocated from the paging storage pool. This new logical volume is to have a size equal to the logical memory allocation for the client logical partition, and thus, the new maximum memory size for the new logical partition is obtained 610. Metadata is used to designate by the configuration manager that this logical volume is being created automatically for the purposes of being a paging space device.

The manager verifies that there is an existing paging storage pool, which allows for the automated selection of logical volumes 620. As a default, a paging storage pool may be created with initialization of the system. Assuming that at least one paging storage pool as described herein exists, then the configuration manager automatically creates a logical volume in the paging storage pool for the newly created client logical partition 630. This logical volume is then added or designated as a paging space device for the newly created client logical partition 640, and the paging space device is bound or mapped to the logical partition 650, which completes automated creation of the paging space device for the newly created logical partition 665. If there is no existing paging storage pool for automated logical volume designation, then the configuration manager selects a manually-created (for example, by a system administrator) paging space device 660 from the storage pool, and binds this manually-created paging space device to the newly created logical partition 650, which completes processing 665.

Figure 7:
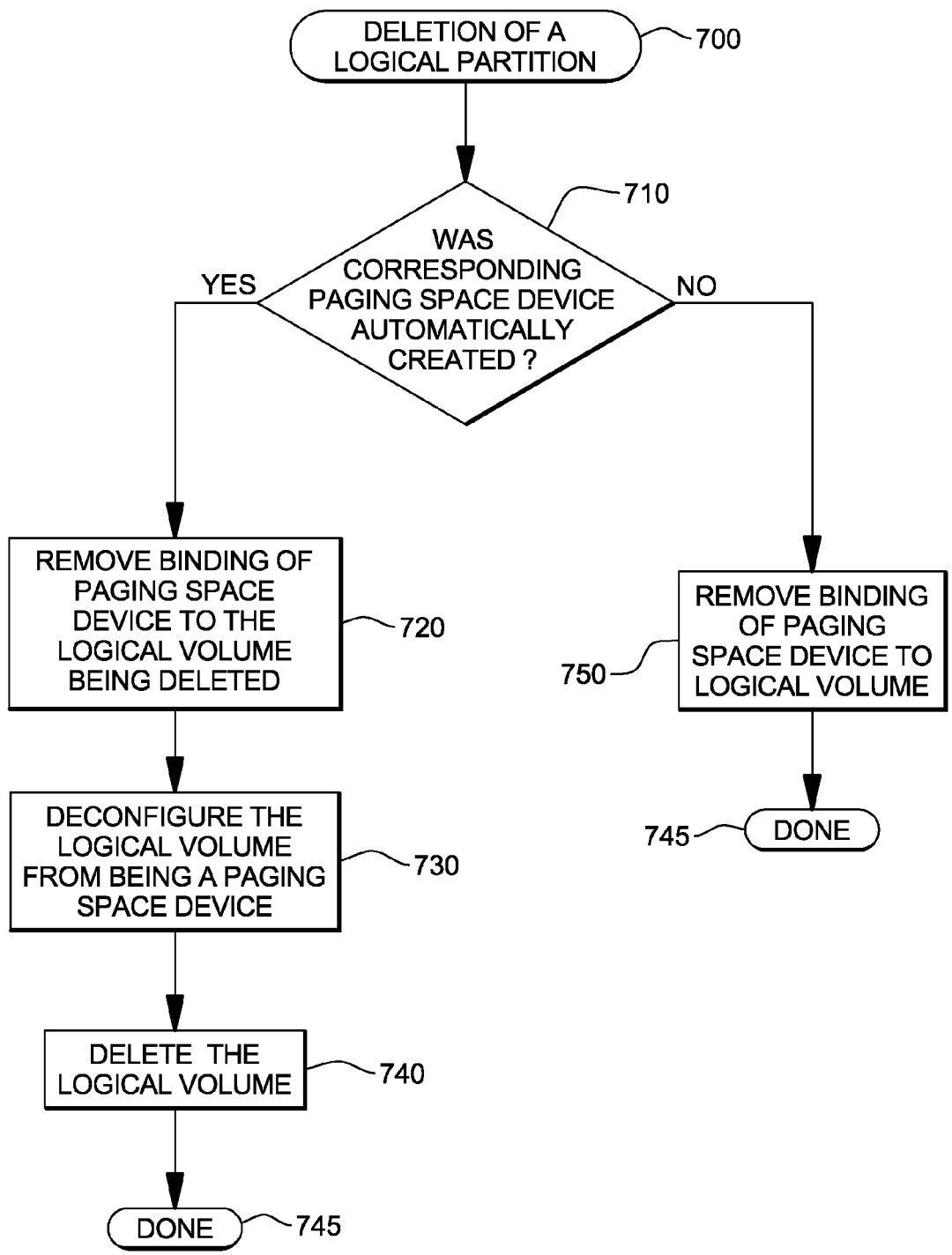
FIG. 7 is a flowchart of one embodiment of logic for managing deletion of a logical volume responsive to deletion of a logical partition within a shared memory data processing system, in accordance with an aspect of the present invention.

As illustrated in FIG. 7, the configuration manager is also provided with logic to automatically respond to deletion of a client logical partition 700 by determining whether the corresponding paging space device for that logical partition includes metadata which indicates that it was automatically created to be a paging space device. If "yes", then the logical volume is automatically deleted by first removing binding or mapping of the paging space device to the logical volume being deleted 720, and then deconfiguring the logical volume from being a paging space device 730, after which the logical volume is deleted 740, which completes processing 745. Note that deletion of the logical volume frees the space in the storage pool for use by, for example, another client logical partition. If the corresponding paging space device was not automatically created, then the configuration manager removes binding of the paging space device to the logical volume 750, which completes processing 745. In this case, the paging space device remains within the storage pool but is unbound or unmapped to a particular logical volume. Note that by automatically deleting logical volumes as described herein, the customer does not have to track the storage pool configuration, as well as their logical partition configuration, since the configuration manager automatically maintains both configurations in sync.

Figure 8:
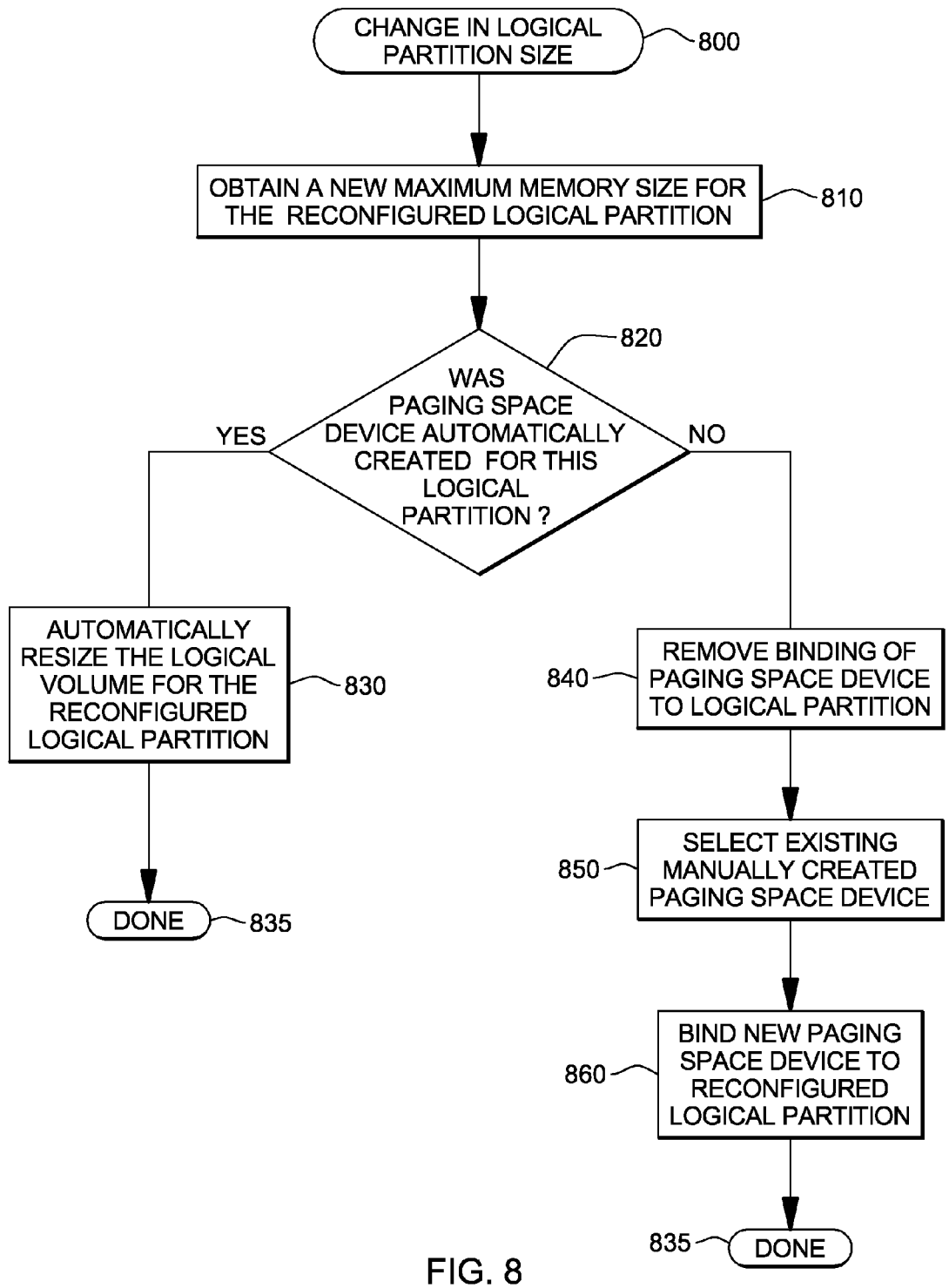
FIG. 8 is a flowchart of one embodiment of logic for managing resizing of a logical volume in the paging storage pool responsive to change in the corresponding logical partition's maximum memory size, in accordance with an aspect of the present invention.

FIG. 8 illustrates one embodiment of configuration manager logic for changing size of a logical volume responsive to resizing of the corresponding logical partition. When a client logical partition's memory allocation changes 800, the configuration manager obtains a new maximum memory size for the resized logical partition 810. The manager then determines whether the partition's paging space device is a logical volume that has metadata which indicates that it was automatically created to be a paging space device for that logical partition 820, and if so, the manager automatically resizes the logical volume for the resized logical partition 830, which completes processing 835. If the metadata does not indicate that the associated paging space device was automatically created for the logical partition being resized, then binding of the paging space device to the resized logical partition is removed 840, and an existing, manually-created paging space device in the storage pool is selected 850. This new paging space device is then bound or mapped to the resized logical partition 860, which completes the reconfiguration processing 835. Note that by having the configuration manager know which logical volumes can be automatically be managed, enhanced performance is gained by having the system be able to use space within the paging storage pool without having to clear it, since it is used for paging, any reads of a "sector" that has not been written can be rejected. This allows for faster defragmentation of the paging space device when client partitions are powered off.

Optimizing defragmenting of the storage pool is facilitated herein by the configuration manager concepts described above. By optimizing defragmentation, enhanced performance of the storage pool is obtained. For example, if the following logical volumes are fragmented:

```
|V1 data|V2 data|more V1 data|unused space|
```

Defragmenting of the storage pool can result in:

```
|V1 data |V2 data |unused space|
```

The defragmentation operation is optimized because the configuration manager knows which subset of logical volumes is currently in use and need only copy those portions. This can be accomplished by interpreting a bitmap at the beginning of a logical volume which determines which portions have valid data. This bitmap is not built into the logical volume manager, but could be part of the application logic for the paging space device management (i.e., data within the logical volume).

Further details on shared memory partition data processing systems are provided in the following, co-filed patent applications, the entirety of each of which is hereby incorporated herein by reference: "Hypervisor-Based Facility for Communicating Between a Hardware Management Console and a Logical Partition", U.S. Ser. No. 12/403,402; "Hypervisor Page Fault Processing in a Shared Memory Partition Data Processing System", U.S. Ser. No. 12/403,408; "Managing Assignment of Partition Services to Virtual Input/Output Adapters", U.S. Ser. No. 12/403,416; "Dynamic Control of Partition Memory Affinity in a Shared Memory Partition Data Processing System", U.S. Ser. No. 12/403,440; "Transparent Hypervisor Pinning of Critical Memory Areas in a Shared Memory Partition Data Processing System", U.S. Ser. No. 12/403,447; "Shared Memory Partition Data Processing System with Hypervisor Managed Paging", U.S. Ser. No. 12/403,459; "Controlled Shut-Down of Partitions Within a Shared Memory Partition Data Processing System", U.S. Ser. No. 12/403,472; and "Managing Migration of a Shared Memory Logical Partition From a Source System to a Target System", U.S. Ser. No. 12/403,485.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 9:
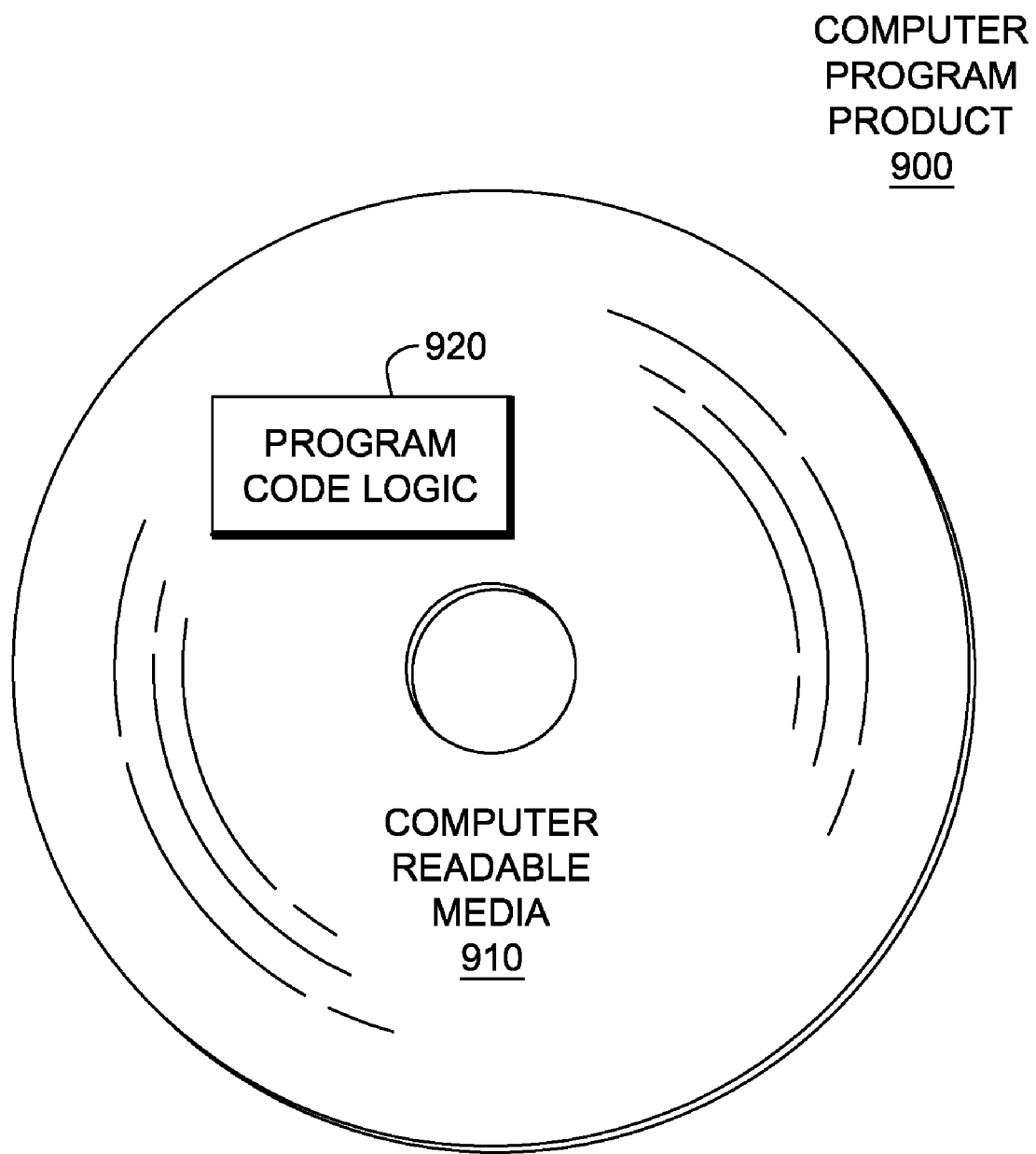
FIG. 9 depicts one embodiment of a computer program product incorporating one or more aspects of the present invention.

One example of an article of manufacture or a computer program product incorporating one or more aspects of the present invention is described with reference to FIG. 9. A computer program product 900 includes, for instance, one or more computer-readable media 910 to store computer readable program code means or logic 920 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of managing a paging space device in a shared memory partition data processing system, the method comprising:
    managing a paging storage pool comprising one or more physical storage devices for holding logical memory pages external to physical memory managed by a hypervisor of the shared memory partition data processing system, the managing comprising:
        responsive to creation of a new logical partition within the shared memory partition data processing system, automatically defining a logical volume in the paging storage pool from block storage for use as said paging space device for the new logical partition, the automatically defining occurring absent use of a filesystem, wherein the said paging space device is other than a file in a filesystem; and automatically specifying the logical volume as the paging space device for the new logical partition and binding the paging space device to the new logical partition, wherein the logical volume is sized to accommodate a defined maximum memory size of the new logical partition.

2. The method of claim 1, wherein the managing is performed by a configuration manager within a paging service partition of the shared memory partition data processing system, the paging service partition interfacing the hypervisor and the paging storage pool of the shared memory partition data processing system.

3. The method of claim 1, wherein the managing further comprises, responsive to creation of the new logical partition within the shared memory partition data processing system, automatically obtaining the defined maximum memory size of the new logical partition, and verifying existence of the paging storage pool comprising the one or more physical storage devices, and if so, proceeding with the automatically defining, and the automatically specifying and binding.

4. The method of claim 3, wherein the one or more physical storage devices include automatically defined logical volumes specified as paging space devices by the managing, as well as manually-created, user-defined paging space devices.

5. The method of claim 1, wherein the managing further comprises:

responsive to deletion of a logical partition of the shared memory partition data processing system, determining whether a paging space device of the logical partition being deleted was automatically established by the managing, and if so, removing binding of that paging space device to its corresponding logical volume, deconfiguring that logical volume from being a paging space device, and deleting that logical volume, thereby returning that logical volume to unused storage within in the paging storage pool.

6. The method of claim 5, wherein the managing further comprises removing binding of the paging space device of the logical partition being deleted to the deleted logical volume when the paging space device of the logical partition being deleted was other than automatically established by the managing, thereby freeing the paging space device of the logical partition being deleted for subsequent use.

7. The method of claim 1, wherein the managing further comprises, responsive to change in a defined maximum memory size of a logical partition, obtaining a new maximum memory size of a resized logical partition, and determining whether its paging space device in the paging storage pool was automatically established by the managing, and if so, automatically resizing the logical volume for the resized logical partition within the paging storage pool to correspond with a change in the defined maximum memory size of the resized logical partition.

8. The method of claim 7, wherein the managing further comprises, when the resized logical partition's paging space device in the paging storage pool was other than automatically established by the managing, removing binding of that paging space device to the resized logical partition, selecting a different, manually-created paging space device for the resized logical partition, and binding the selected paging space device to the resized logical partition.

9. A shared memory partition data processing system comprising:

one or more physical storage devices comprising a paging storage pool for holding logical memory pages external to physical memory managed by a hypervisor of the shared memory partition data processing system;

a paging service partition coupled to the one or more physical storage devices for managing the paging storage pool, the paging service partition being a virtual input/output server (VIOS) partition of the shared memory partition data processing system, and the paging service partition comprising a configuration manager for, in part, managing the paging storage pool; and wherein the configuration manager responds to creation of a new logical partition within the shared memory partition data processing system by automatically defining a logical volume in the paging storage pool from block storage for use as a paging space device for the new logical partition, the automatically defining occurring absent use of a filesystem, wherein the paging space device is other than a file in a filesystem, and wherein the configuration manager automatically specifies the logical volume as the paging space device for the new logical partition and binds the paging space device to the new logical partition, wherein the logical volume is sized to accommodate a defined maximum memory size of the new logical partition.

10. The shared memory partition data processing system of claim 9, wherein the configuration manager responds to deletion of a logical partition of the shared memory partition data processing system by determining whether the deleted logical partition's paging space device was automatically established by the configuration manager, and if so, by removing binding of the paging space device of the deleted logical partition to the deleted logical partition, deconfiguring a corresponding logical volume from being a paging device, and deleting the corresponding logical volume, thereby returning the corresponding logical volume to unused storage within the paging storage pool.

11. The shared memory data processing system of claim 10, wherein the configuration manager further responds to deletion of a logical partition of the shared memory partition data processing system by removing binding of its paging space device to the deleted logical volume when the paging space device of the deleted logical partition was other than automatically established by the configuration manager, thereby freeing the paging space device of the deleted logical partition for subsequent use.

12. The shared memory data processing system of claim 9, wherein the configuration manager responds to a change in a defined maximum memory size of a resized logical partition in the shared memory partition data processing system by obtaining a new maximum memory size of the resized logical partition, and determining whether its paging space device was automatically established by the configuration manager, and if so, by automatically resizing a logical volume for the resized logical partition within the paging storage pool to correspond to the change in the defined maximum memory size of the resized logical partition.

13. The shared memory data processing system of claim 12, wherein the configuration manager, when the resized logical partition's paging space device in the paging storage pool was other than automatically established by the configuration manager, responds to the change in the defined maximum memory size of the resized logical partition by removing binding of the paging space device of the resized logical partition, selecting a different, manually-created paging space device for the resized logical partition, and binding the selected paging space device to the resized logical partition.

14. An article of manufacture comprising:
at least one non-transitory computer-readable medium having computer-readable program code logic to manage a paging space device in a shared memory partition data processing system, the computer-readable program code logic when executing on a processor performing:
managing a paging storage pool within one or more physical storage devices for holding logical memory pages external to physical memory managed by a hypervisor of the shared memory partition data processing system, the managing comprising:
responsive to creation of a new logical partition within the shared memory partition data processing system, automatically defining a logical volume in the paging storage pool from block storage for use as said paging space device for the new logical partition, the automatically defining occurring absent use of a filesystem, wherein the said paging space device is other than a file in a filesystem; and
automatically specifying the logical volume as the said paging space device for the new logical partition and binding the said paging space device to the new logical partition, wherein the logical volume is sized to accommodate a defined maximum memory size of the new logical partition.

15. The article of manufacture of claim 14, wherein the managing is performed by a configuration manager within a paging service partition of the shared memory partition data processing system, the paging service partition interfacing the hypervisor and the paging storage pool of the shared memory partition data processing system.

16. The article of manufacture of claim 14, wherein the managing further comprises, responsive to creation of the new logical partition within the shared memory partition data processing system, automatically obtaining the defined maximum memory size of the new logical partition, and verifying existence of the paging storage pool within the one or more physical storage devices, and if so, proceeding with the automatically defining, and the automatically specifying and binding.

17. The article of manufacture of claim 14, wherein the managing further comprises:
responsive to deletion of a logical partition of the shared memory partition data processing system, determining whether a paging space device of the logical partition being deleted was automatically established by the managing, and if so, removing binding of that paging space device to its corresponding logical volume, deconfiguring that logical volume from being a paging space device, and deleting the corresponding logical volume, thereby returning the logical volume to unused storage within in the paging storage pool.

18. The article of manufacture of claim 17, wherein the managing further comprises removing binding of the paging space device of the logical partition being deleted to the deleted logical volume when the paging space device of the logical partition being deleted was other than automatically established by the managing, thereby freeing the paging space device of the logical partition being deleted for subsequent use.

19. The article of manufacture of claim 14, wherein the managing further comprises, responsive to change in a defined maximum memory size of a logical partition, obtaining a new maximum memory size of a resized logical partition, and determining whether its paging space device in the paging storage pool was automatically established by the managing, and if so, automatically resizing a logical volume for the resized logical partition within the paging storage pool to correspond with the change in the defined maximum memory size of the said logical partition.

20. The article of manufacture of claim 19, wherein the managing further comprises, when the resized logical partition's paging space device in the paging storage pool was other than automatically established by the managing, removing binding of the paging space device of the resized logical partition to the resized logical partition, selecting a different, manually-created paging space device for the resized logical partition, and binding the selected paging space device to the resized logical partition.

* * * * *